JOHN BLAETTLER.
Improvement in Devices for Forming Articles of Food for the Table.
No. 124,782.        Patented March 19, 1872.
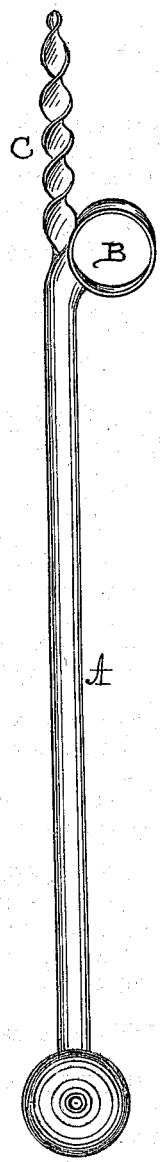
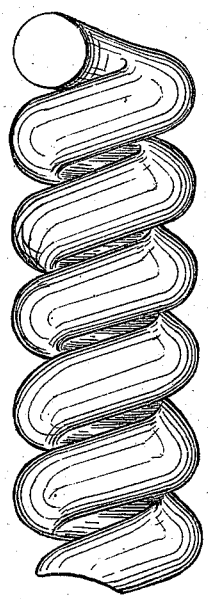

124,782

UNITED STATES PATENT OFFICE.

JOHN BLAETTLER, OF PHILADELPHIA, PENNSYLVANIA, ASSIGNOR TO HERMAN MEYER, OF SAME PLACE.

IMPROVEMENT IN DEVICES FOR FORMING ARTICLES OF FOOD FOR THE TABLE.

Specification forming part of Letters Patent No. 124,782, dated March 19, 1872.

*To all whom it may concern:*

Be it known that I, JOHN BLAETTLER, of the city and county of Philadelphia and State of Pennsylvania, have invented a new and useful Device for Preparing Articles for the Table; and I do hereby declare the following to be a clear and exact description of the nature thereof sufficient to enable others skilled in the art to which my invention appertains to fully understand and use the same, reference being had to the accompanying drawing making part of this specification, in which—

Figures 1 and 2 are views from two sides of the device illustrating my invention. Fig. 3 shows the prepared article.

Similar letters of reference indicate corresponding parts in Figs. 1 and 2.

This invention relates to a device for preparing articles of food for boiling, frying, baking, &c. It consists of a knife arranged diagonally on a holder which has a borer at one end and a handle at the other, whereby the knife may be pressed against the article of food, and by rotation cut helically or spirally into the same, thereby cutting or forming it into coils, prepared for the stove, oven or otherwise.

Referring to the drawing, A represents a shank or holder, to which is secured a cutter or knife, B, and having a handle for convenient operation. This cutter is arranged diagonally with the line of the holder, and consists of a suitable piece of metal or other material with a cutting-edge, and may be said to be endless—that is to say, it may be cast, stamped, struck up, or otherwise formed in one piece, or of a piece of bent material having its ends united, so that the edge of the cutter will be continuous. This cutter is arranged diagonally, as has been stated, and by rotation of the holder will cut into the article, and, describing a helix or spire, cuts or forms the portion of the article around which it passes into a helix, spire, or scroll. In order to assist this operation I secure to or form with the end of the holder a borer, C, which will be in advance of the cutter. It is evident that rotation of the holder will cause the borer to take hold of the article to be cut, thus screw or force itself into the article, and thereby draw with it the cutter on the holder. When the length of the article is reached the cutter is to be removed, and this may be accomplished by rotation in reverse direction; but as this may injure the scroll, and should be avoided, the handle D of the holder A will be made removable, so that the latter need only be drawn through the article from the side or end of the article opposite to that in which it entered.

This invention will be found useful for cutting or paring vegetables, fruit, &c., in that it cuts out the body of the same, and thus removes the skin or paring. It will also form dough, candy, &c., into scrolls.

The cutter may be constructed in the form of a circle, cross, star, &c., and in either case accomplishes the same results.

Having thus described my invention, what I claim as new, and desire to secure by Letters Patent, is—

A device for forming or cutting articles of food into coils, consisting of an endless knife, B, arranged diagonally on a holder, A, in connection with the borer C and handle D, operating substantially in the manner and for the purpose set forth.

The above signed by me this 31st day of January, 1872.

JOHN BLAETTLER.

Witnesses:
JOHN A. WIEDERSHEIM,
ALFRED C. SAVIDGE.